1,481,392

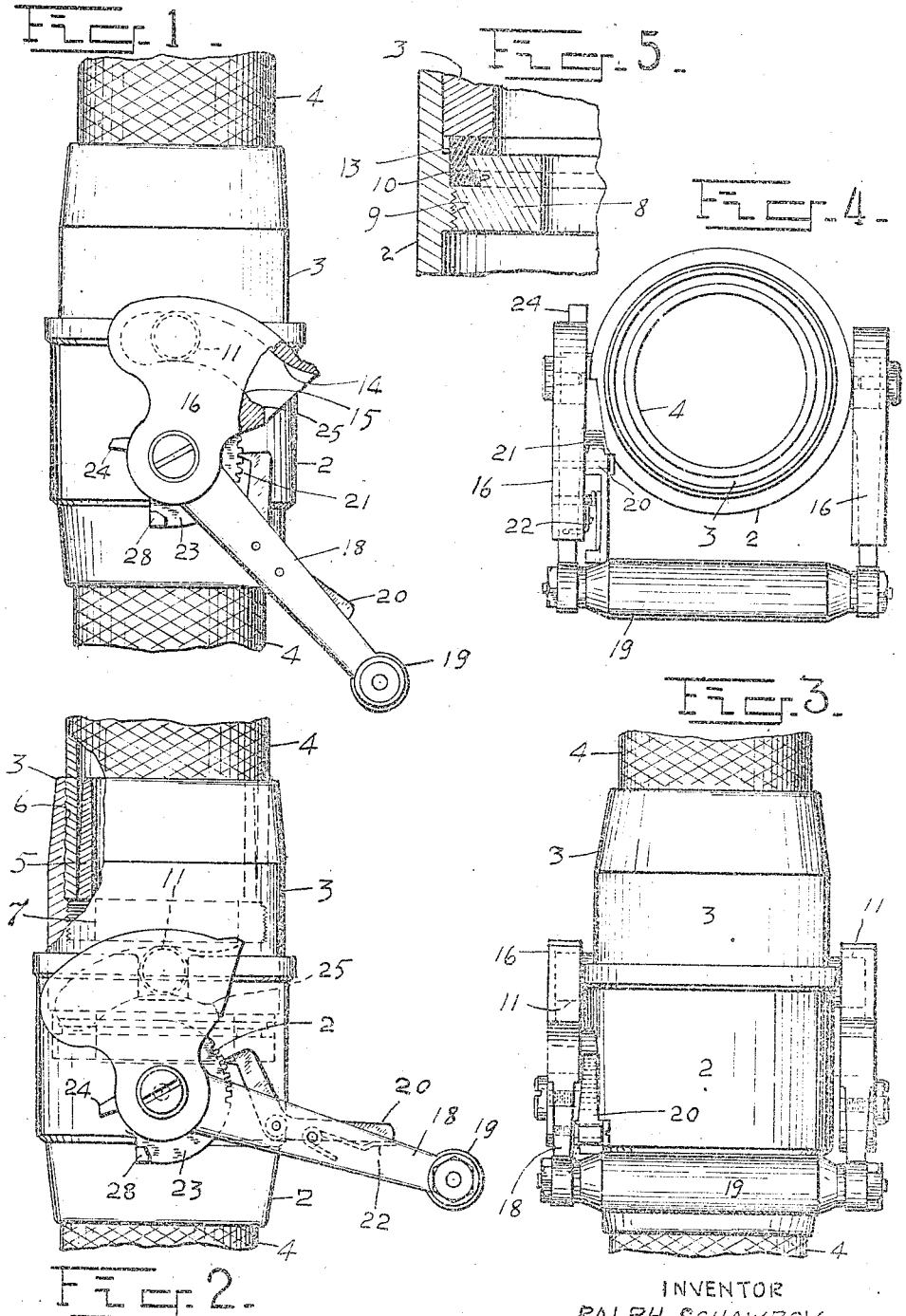

Patented Jan. 22, 1924.

UNITED STATES PATENT OFFICE.

RALPH SCHAWROW, OF BAYONNE, NEW JERSEY.

HOSE COUPLING.

Application filed December 21, 1920. Serial No. 432,315.

*To all whom it may concern:*

Be it known that I, RALPH SCHAWROW, a citizen of the United States, whose residence and post-office address is 280 Broadway, Bayonne, county of Hudson, and State of New Jersey, have invented certain new and useful Improvements in Hose Couplings, fully described and represented in the following specification and the accompanying drawings, forming a part of the same.

This invention relates to a new and useful improvement in temporary couplings for tubular bodies such as fire hose.

An object of the invention is to provide a practical means whereby the two sections of a hose may be conveniently and expeditiously united for the passage of a fluid.

A further object being the provision of a packing or gasket which will resist a tendency to be dislocated as when the coupling is used during the winter and the contacting portion of the coupling and the gasket freezes fast.

A further object being to provide means whereby the two members of the coupling are caused to separate as the means which secures them together is actuated for effecting their release.

A still further object being the provision of a means in the form of a ratchet for the purpose of locking the closing mechanism in a given position.

I am aware that couplings heretofore have been made with the object of uniting two sections of a tube. Couplings of this character are commonly provided with levers arranged to engage with lugs, the said levers and lugs being disposed on the opposing members of the coupling.

The above mentioned form of coupling afforded no provision whereby a variation in the thickness of the gasket could be compensated for by a variation of the distance between the members when the coupling is in a working position.

In practice it is important that the above condition be taken into account, particularly to meet the needs of rapid assembly as for example when used in connection with the practice of the fire department where a gasket is liable to have become worn through use and where limited time prohibits a renewal of the said gasket. In my device the cam is arranged to permit a variation of the distance between the two members of the coupling when united in an operating position. The locking means as I provide permits the said coupling to be fixed in its working position either with a new gasket of a standard thickness or with a gasket that has become reduced in thickness through wear.

Similar numerals will indicate similar parts throughout the several views. Fig. 1 is a side view of my coupling partly in section in position for connecting two sections of a tube, Fig. 2 is a side view of the coupling partly in section and showing the operating lever in a different position, Fig. 3 represents a right hand view of Fig. 2; Fig. 4 shows a top plan view of Fig. 3 and Fig. 5 is a fragmentary sectional view of a detail of the packing on an enlarged scale.

My coupling includes a female tubular member 2 adapted to receive a male tubular member 3.

Each of the said members is secured to a section of a hose 4 by means of a tapered ring 5 adapted to force the walls of the tube into corrugations 6 on the members. An annulus 7 is arranged to be screwed toward the ends of the hose and thereby thrust the ring 5 into the hose to secure the tube within the members.

The member 2 is provided with the removable ring 8 to provide a seat for the gasket 13. Threads 9 are disposed about the periphery of the said ring, whereby it may be screwed into an internally threaded portion of the member 2. The ring 8 has formed therewith the annular groove 10. The gasket 13 is arranged to lie partly upon the ring 8 and partly in the groove 10. The gasket is substantially U-shaped in cross-section and when in position is retained in place by its confinement with the ring 8, the wall of the member 2 and the adjoining end face of the member 3.

This gasket is formed to retain its position and to resist displacement due to its attachment to the contacting member when the said member is removed. At opposite sides of the member 2 are disposed cylindrical lugs 11.

Arranged upon each side of the coupling are bell-crank members or levers having one arm 16 thereof provided with upper and lower cam surfaces 14 and 15 adapted to be moved in frictional contact with lugs 11. The other arms 18 of the crank are extended and connected by a cross piece 19 in the form of a handle.

Upon one of the levers 18 is pivoted a pawl 20 which is tensionally held in mesh with teeth 21 by means of spring 22. The teeth are arranged on a boss 23 which is integral with the member 2. The said boss is also provided with finger 28 which engages with a stop 24 fixed to the crank when the said crank is in position for releasing the coupling members. Adjacent the front end of the lower cam surface 15 is provided a raised portion or undulation 25 which serves as a means for lifting the female member from its seat upon the gasket to separate the coupling.

In practice the tube portion of my coupling having been secured to sections of a tube it is simply necessary to insert the male into the female member and move the lever to engage the lug 11 with the cam surface. The first action of the lower cam upon the lug will cause it to ride over the rise 25 and a continued movement of the lever 18 toward the hose effects a union of the coupling by the action of the upper cam surface to draw the male member firmly upon the gasket. To eliminate the possibility of the lever 18 being accidentally moved it is locked when the coupling is united by means of the pawl which engages a suitably located notch. When it is desirable to divide the coupling the pawl is released from the notch and the lever 18 lifted thereby causing the cam surfaces to move until the lugs pass over the undulation 25, at which point the members are forced apart. The said cam surfaces are made of sufficient lengths to accommodate a variety of thicknesses of gaskets.

In couplings of the character to which this invention relates considerable difficulty has been encountered during cold weather at which time the low temperature causes the conducted water to freeze either between the united members or about the coupling upon which water has been splashed or otherwise deposited. This is particularly true when the members are used as a head coupling, that is when one member is attached directly to the hydrant and subject to the reception of externally deposited water form a leaky connection. Couplings as heretofore constructed required the expenditure of a great amount of labor to effect their separation which often resulted in damage to the members or hose and obviously consumed a great deal of time. It is also true that couplings employed on oil lines or lines conducting high temperature fluids are subject to the same disadvantage inasmuch as in the case of oil or other viscous fluid a film of oil becomes lodged between the gaskets and securely unites them or in the case of a high temperature fluid the gaskets become adherent and are difficult to part.

The present invention provides means to overcome the difficulty in parting the united members and the preferred means of accomplishing this result with a minimum amount of manual labor, consists in the provision of the raised portion 25 of the cam surface 15 which acts as a wedge upon the completion of a movement of the lever arms 18 to release the male and female members of the coupling.

Although a practical embodiment of my invention is illustrated and described it is to be understood that other modifications may be made without departing from the spirit and scope of the invention as set forth in the appended claims.

What is claimed is—

1. A hose coupling comprising male and female members, levers pivoted at opposite sides of the female member lugs integral with the male member, cam surfaces upon one of the arms of the levers and arranged to engage with the lugs of the male member, an undulation at the exposed end of one of the said surfaces for the purpose of lifting the male member subequent to the movement of the cam for releasing the said members.

2. A hose coupling comprising male and female members, levers pivoted at opposite sides of the female member, upper and lower cam surfaces disposed upon the levers, lugs disposed at opposite sides of the male member and arranged to engage with the cam surfaces and means comprising a pawl and a toothed segment whereby the said cam surfaces may be retained in a given relation with the said lugs.

3. A hose coupling comprising male and female members, lugs oppositely disposed at opposite sides of the male member, bell-crank members disposed at opposite sides of the female member, cam surfaces arranged upon the short-arm of the said crank adapted to engage with the said lugs, a toothed segment secured to the female member, a pawl pivoted upon the long-arm of the crank whereby the said bell-crank may be locked in a given position by means of the engagement of the said pawl with the teeth of the said segment.

In testimony whereof I have hereunto set my hand.

RALPH SCHAWROW.